(12) United States Patent
Marleux et al.

(10) Patent No.: US 7,089,486 B1
(45) Date of Patent: Aug. 8, 2006

(54) CONTEXT SWITCHING FOR ON-THE-FLY PROCESSING OF FRAGMENTED FRAMES

(75) Inventors: Benoit Marleux, Vincennes (FR); Steven Novak, Agoura, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 525 days.

(21) Appl. No.: 10/219,819

(22) Filed: Aug. 16, 2002

(51) Int. Cl.
*H03M 13/09* (2006.01)

(52) U.S. Cl. ...................... 714/807; 370/474
(58) Field of Classification Search .......... 714/807, 714/811; 370/474
See application file for complete search history.

(56) References Cited

U.S. PATENT DOCUMENTS

| | | | | | |
|---|---|---|---|---|---|
| 4,539,676 | A | * | 9/1985 | Lucas | 370/354 |
| 5,136,584 | A | * | 8/1992 | Hedlund | 370/399 |
| 5,220,562 | A | * | 6/1993 | Takada et al. | 370/404 |
| 5,287,347 | A | * | 2/1994 | Spanke | 370/235 |
| 5,568,477 | A | * | 10/1996 | Galand et al. | 370/229 |
| 5,570,355 | A | * | 10/1996 | Dail et al. | 370/352 |
| 5,583,859 | A | * | 12/1996 | Feldmeier | 370/471 |
| 5,606,559 | A | * | 2/1997 | Badger et al. | 370/395.7 |
| 5,768,275 | A | * | 6/1998 | Lincoln et al. | 370/419 |
| 5,796,735 | A | * | 8/1998 | Miller et al. | 370/395.4 |
| 5,822,612 | A | * | 10/1998 | Thomas et al. | 710/6 |
| 5,867,509 | A | * | 2/1999 | Tanaka | 714/758 |
| 5,926,303 | A | * | 7/1999 | Giebel et al. | 398/117 |
| 5,963,543 | A | * | 10/1999 | Rostoker et al. | 370/232 |
| 5,974,466 | A | * | 10/1999 | Mizutani et al. | 709/236 |
| 6,026,443 | A | * | 2/2000 | Oskouy et al. | 709/230 |
| 6,279,140 | B1 | * | 8/2001 | Slane | 714/807 |
| 6,289,019 | B1 | * | 9/2001 | Dieudonne | 370/395.3 |
| 6,310,884 | B1 | * | 10/2001 | Odenwald, Jr. | 370/412 |
| 6,317,433 | B1 | * | 11/2001 | Galand et al. | 370/395.2 |
| 6,345,302 | B1 | * | 2/2002 | Bennett et al. | 370/395.2 |
| 6,466,997 | B1 | * | 10/2002 | Ross et al. | 710/48 |
| 6,535,512 | B1 | * | 3/2003 | Daniel et al. | 370/395.1 |
| 6,629,288 | B1 | * | 9/2003 | Bernath et al. | 714/807 |
| 6,714,989 | B1 | * | 3/2004 | Mizutani et al. | 709/250 |
| 6,760,333 | B1 | * | 7/2004 | Moody et al. | 370/395.1 |
| 6,779,050 | B1 | * | 8/2004 | Horton et al. | 710/30 |
| 2003/0061623 | A1 | * | 3/2003 | Denney et al. | 725/125 |

* cited by examiner

*Primary Examiner*—Stephen M. Baker
(74) *Attorney, Agent, or Firm*—Harrity Snyder LLP

(57) ABSTRACT

A frame analyzer component and a memory management unit process frames received over cable television lines. The frame analyzer component may receive frames that were transmitted over the cable television lines and that were processed by a digital signal processor. The frame analyzer component checks incoming frames or frame fragments for consistency and errors. Results from the frame analyzer component relative to frame fragments may be stored in a context memory. When a later fragment of the frame arrives, the previous context of the frame can be restored and used to continue processing the frame. The memory management unit stores the frames and frame fragments in separate memory management tables.

26 Claims, 11 Drawing Sheets

CONTEXT SWITCHING FOR ON-THE-FLY PROCESSING OF FRAGMENTED FRAMES

BACKGROUND OF THE INVENTION

A. Field of the Invention

The present invention relates generally to network data transmission, and more particularly, to data transmission through cable modem systems.

B. Description of Related Art

Cable modems allow end-users to connect to networks, such as the Internet, through cable TV lines. In a manner similar to traditional telephone modems, cable modems modulate between digital signals from an attached computer to analog signals that are transmitted over the cable lines. Unlike traditional telephone dial-up modems, however, cable modems may provide significantly greater throughput.

Cable modems are generally installed locally to the end-user, and communicate with a cable modem termination system (CMTS) at a local cable TV company office. Multiple cable modems may share a single communication channel with the CMTS. The cable modems can receive from and send signals to the CMTS, but not to other cable modems on the line.

When sharing a communication channel with a CMTS, the cable modems may use a time division multiple access (TDMA) scheme in which the modems transmit units of data, called frames, to the CMTS only during designated time intervals. The CMTS receives these frames as a series of intermingled frames and separates the frames into a series of time sequenced frames based on the transmitting cable modems.

FIG. 1 is diagram illustrating transmission and reassembly of a series of frames from two different cable modems. The first cable modem, labeled as cable modem 101 (cable modem X), wishes to transmit the series of frames X1, X2, and X3. The second cable modem, labeled as cable modem 102 (cable modem Y), transmits the two frames Y1 and Y2. Cable modems 101 and 102 transmit their respective frames over a shared cable line to CMTS 103. As shown, the frames are intermingled in time. CMTS 103 reconstructs the order of frame transmission from cable modems 101 and 102 based on information in the header of each frame that identifies the cable modem associated with the frame. A correctly reconstructed series of frames from cable modems 101 and 102 is shown in FIG. 1 as reconstructed X frames 104 and reconstructed Y frames 105.

Data Over Cable Service Interface Specification (DOCSIS) is a commonly used cable modem protocol that defines interface requirements for cable modems. Under DOCSIS, cable modems, instead of transmitting a complete frame, may transmit only a portion of a frame, called a frame fragment. The CMTS receives the frame fragments and reassembles the frame fragments into complete frames. As with entire frames, frame fragments may arrive at the CMTS intermingled with frames or frame fragments from other cable modems.

FIG. 2 is a diagram illustrating fragmented frames. Cable modem 101 again transmits three frames (X1, X2, and X3). Cable modem 102 transmits two frames, the first of which (Y1), is broken into three frame fragments, labeled as Y1(1), Y1(2), and Y1(3). The frame fragments may be intermingled with the frames from cable modem 101. The CMTS, as well as ordering the received frames based on the transmitting cable modem, reassembles frame fragments into complete frames, such as complete frame 210.

In high bandwidth applications, in which multiple cable modems communicate with a single CMTS, it is desirable to reassemble frame fragments and order frames in the correct frame sequence in an efficient manner.

SUMMARY OF THE INVENTION

Systems and methods consistent with the principles of this invention provide for on-the-fly processing of frames and frame fragments in which partial processing results relating to frame fragments are stored. When a later fragment of the frame arrives, the partial results are accessed to restore the processing state of the frame.

One aspect of the invention is directed to a method for processing data items. The method includes determining whether a received data item is a complete data item or a portion of a complete data item. Further, the method includes accessing, when the received data item is determined to be a portion of the complete data item, state information relating to processing of the received data item. The method also includes analyzing the received data item to determine whether the data item contain errors.

A second aspect of the invention is a system that includes a digital signal processing component and an analyzer component. The digital signal processing component receives analog data and converts the analog data to digital data items, a least one of the data items being output by the digital signal processing component as fragments of a complete data item. The analyzer component receives the data items from the digital signal processing component and performs validation processing on the data items as the data items are received from the digital signal processing component. The analyzer component, when processing those of the data items that are received as fragments, retrieves previously stored context information that describes a state of the analyzer component when the analyzer component finished processing a previous fragment of the data item. The analyzer component resumes processing of the data item at the described state.

A third aspect of the invention is a method for processing data items received over a communication line. The method comprises storing a received one of the data items in a memory buffer; determining if the received one of the data items is a complete data frame or a fragment of a data frame; updating an entry in a first circular table to reference the memory buffer when the data item is the complete data frame; updating an entry in a second table to reference the memory buffer when the data item is the fragment of the data frame; and transferring, when a last data item of the fragment of the data frame has been stored in the memory buffer, the entry in the second table to in the first table.

Another aspect of the invention is directed to a memory management device that includes a first table configured to store entries that reference first buffers in a memory, the entries in the first table corresponding to complete data frames stored in the first buffers. A second table is configured to store entries that reference second buffers in the memory, the entries in the second table corresponding to fragments of data frames stored in the second buffers. The second entries are addressable based on a transmitting source of the fragments of the data frames.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claims.

As described below, systems and methods consistent with aspects of the invention include a frame analyzer component and a memory management unit. The frame analyzer component checks incoming frames or frame fragments for consistency and errors. Results from the frame analyzer component that relate to frame fragments may be stored in a context memory. When a later fragment of the frame arrives, the previous context of the frame can be restored. The memory management unit orders the frames and frame fragments using separate order tables.

System Overview

Figure 1:
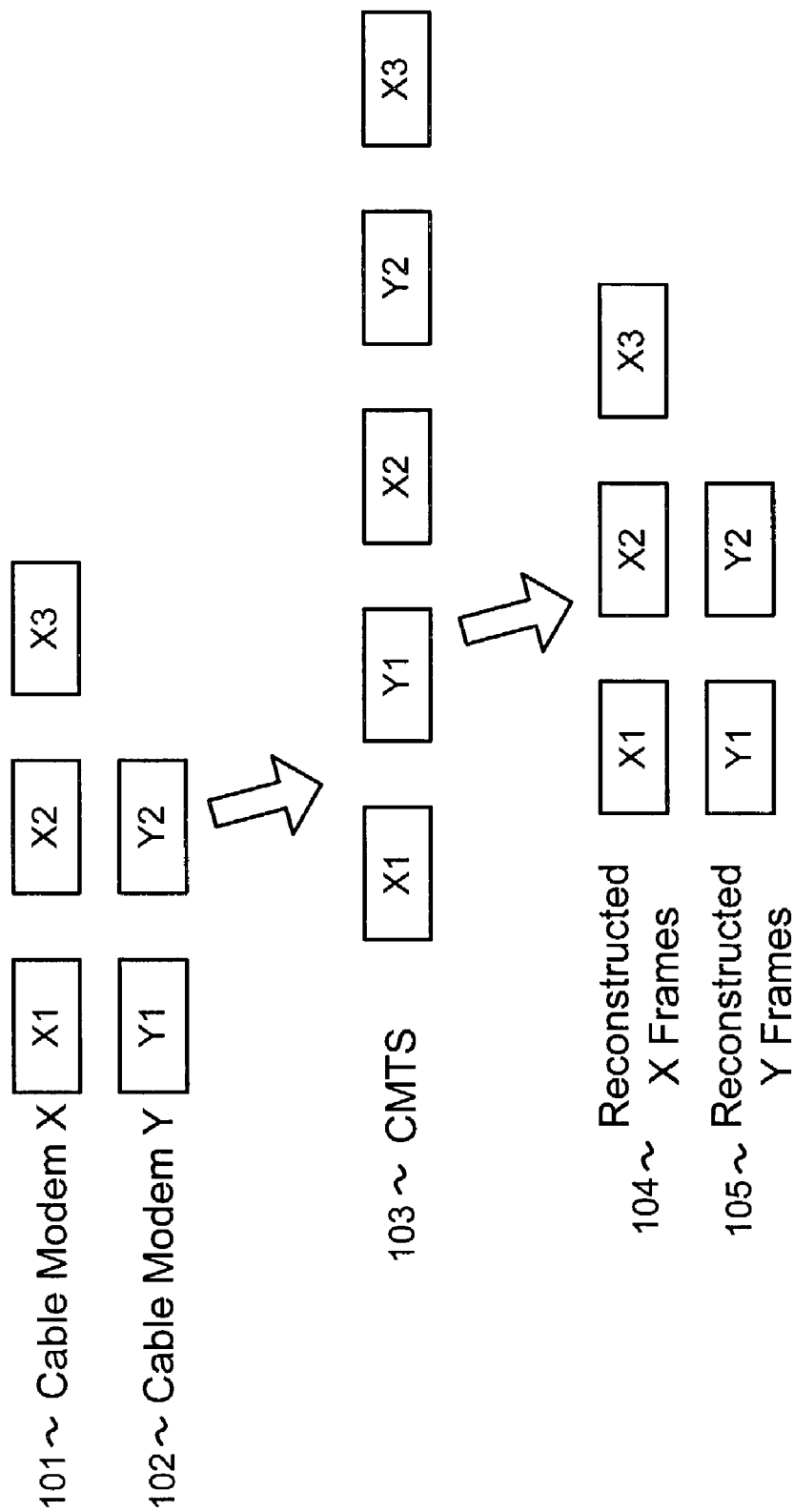
FIG. 1 is a diagram illustrating transmission and reassembly of a series of frames from two different cable modems.
Figure 2:
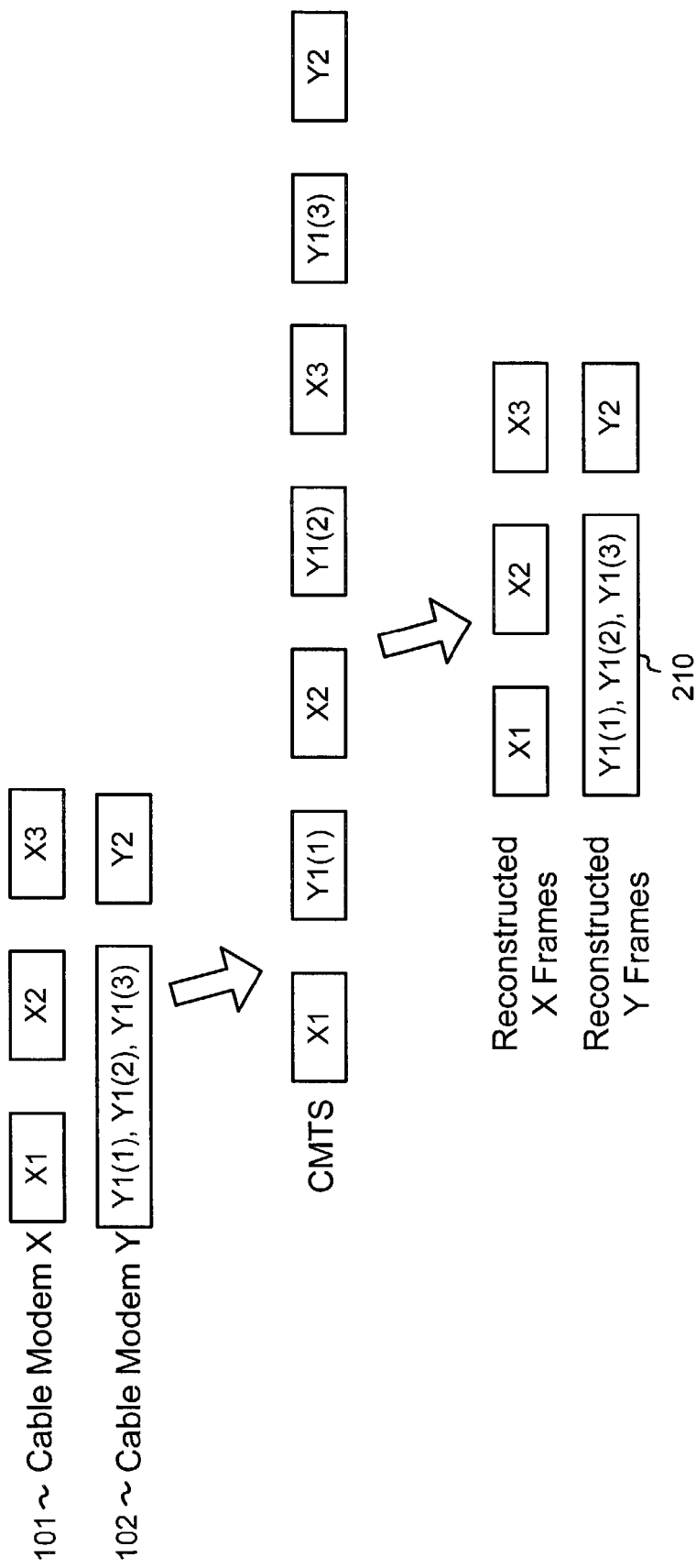
FIG. 2 is a diagram illustrating fragmented frames.
Figure 3:
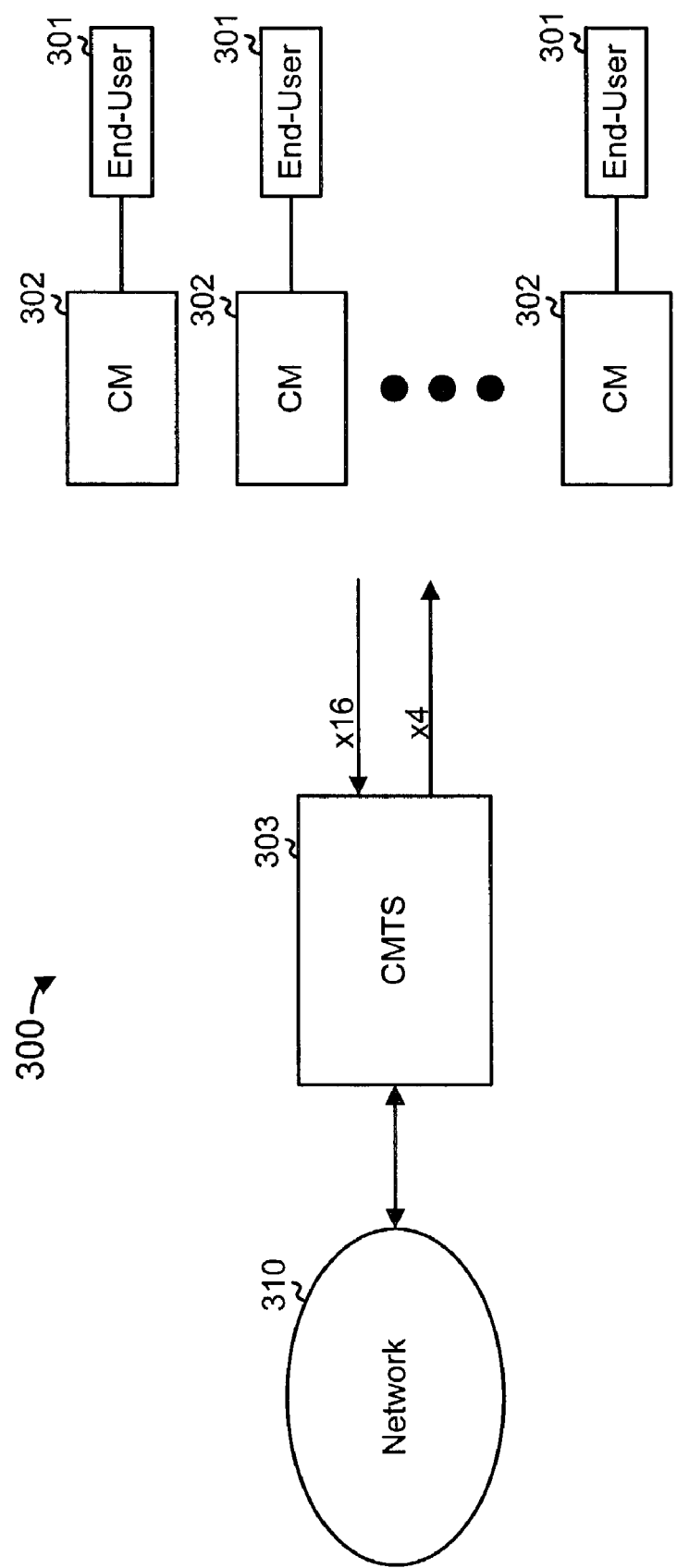
FIG. 3 is a diagram illustrating an exemplary system in which concepts consistent with aspects of the invention may be implemented.

FIG. 3 is a diagram illustrating an exemplary system 300 in which concepts consistent with aspects of the invention may be implemented. System 300 includes a network 310, such as a wide area network (WAN) 310. In one implementation, network 310 is the Internet. End-users 301 connect to network 310 through cable modems (CMs) 302. The cable modems 302 are installed local to the respective end-users 301. Cable modem termination system (CMTS) 303 facilitates communications between cable modems 302 and network 310. A CMTS is typically maintained by a cable TV company at an office in proximity to end-users 301.

CMTS 303 may include a number of upstream (i.e., from the cable modem to the CMTS) channels and downstream (i.e., from the CMTS to the cable modem) channels. For example, cable modems 302 may be served by 16 upstream channels and four downstream channels. The downstream channels may be higher bandwidth channels than the upstream channels. Cable modems 302 transmit data units, called frames, to CMTS 303 during pre-assigned time slots. In situations in which a time slot is available for frame transmission but the time slot is not large enough to transmit a complete frame, one of cable modems 302 may transmit a portion of the complete frame as a frame fragment. CMTS 303 will buffer and reassemble the frame fragments, as described in more detail below.

Figure 4:
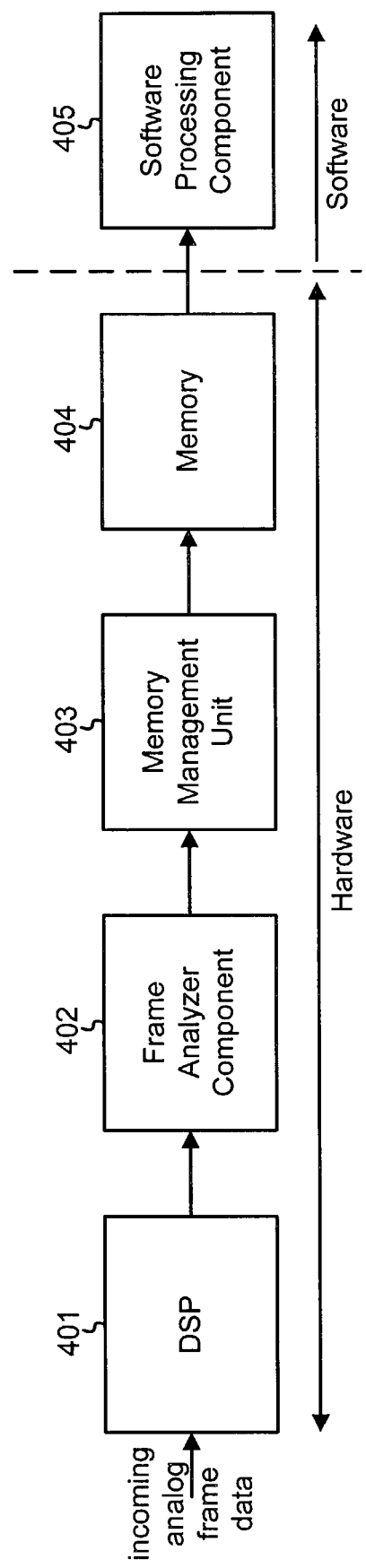
FIG. 4 is a functional diagram illustrating an implementation of how a CMTS may process frames from incoming cable modems.

FIG. 4 is a functional diagram illustrating an implementation of how CMTS 303 may process frames from cable modems 302. Initial operations on incoming frames may be performed in hardware. Specifically, as shown in FIG. 4, these operations are performed by digital signal processor (DSP) 401, frame analyzer component 402, memory management unit 403, and memory 404. Frames stored in memory 404 may be read and additionally processed by software component 405. It should be understood that other combinations of hardware and software could be used.

DSP 401 and frame analyzer component 402 perform initial processing on the incoming frames. More specifically, DSP component 401 converts incoming analog signals on the cable line back into the original sent digital data. Frame analyzer component 402 analyzes the digital frame data stream from DSP component 401. Frame analyzer component 402 may perform a number of validation functions on its received frames, such as checking for frame header consistency, performing Cyclic Redundancy Checks (CRCs), and sorting incoming frames according to frame type. Different frame types may include data frames, management frames, and request frames. In general, the validation functions performed by frame analyzer component 402 are known in the art and will not be described further herein.

Memory management unit 403 receives frames from frame analyzer component 402 and stores them in memory 404.

In addition to performing the above-mentioned functions, frame analyzer component 402, in conjunction with memory management unit 403, consistent with aspects of the present invention, may perform on-the-fly ordering of received frames and error checking of received frames and frame fragments. The on-the-fly (i.e., real-time or near real-time) processing of frames at line-rate allows for maximum throughput from the hardware portion of the system.

Software processing component 405 may handle the frames stored in memory 404. In one embodiment, software processing component 405 represents a software module executing on a processor. When software processing component 405 receives the frames, the frames have been validated, reassembled (when appropriate), and ordered based on the frame source. Software processing component 405 may perform a number of features related to the operation of CMTS 303, such as performing statistical analysis of frame traffic, resolving groups of frames into different formats, such as packets, and transmitting the packets to network 310.

Figure 5:
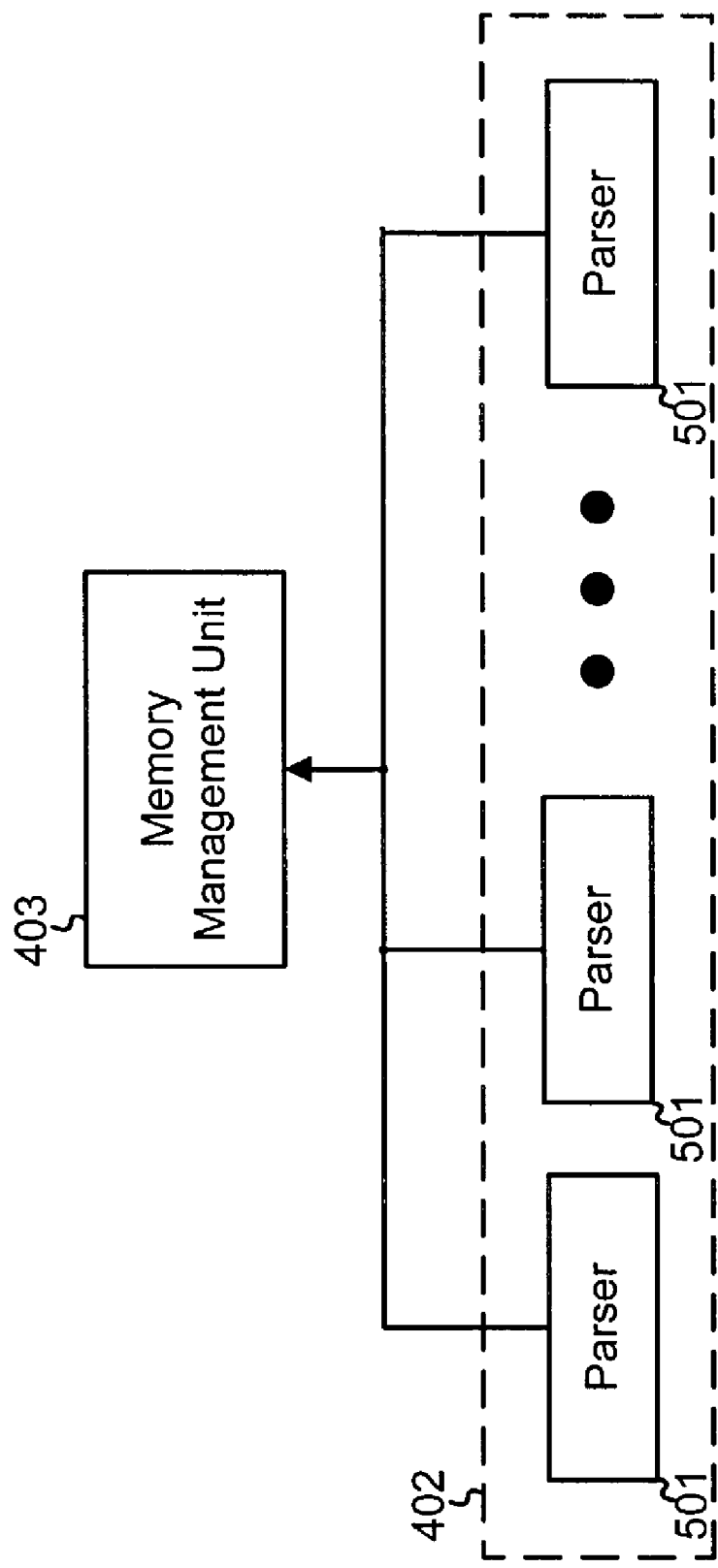
FIG. 5 is a diagram illustrating the frame analyzer component and the memory management unit in additional detail.

FIG. 5 is a diagram illustrating frame analyzer component 402 and memory management unit 403 in additional detail. As shown, frame analyzer component 402 includes a number of frame parsers 501. In one implementation, there may be one parser 501 for each upstream channel. Thus, for a CMTS 303 having 16 upstream channels, there may be sixteen parsers 501. Each of parsers 501 may process a single frame at a time. When a parser 501 finishes processing a frame, the parser will have determined that the frame is error free and should be made available to software processing component 405 or that the frame has an error and should be discarded. At this time, parser 501 may forward the processed frame, or a portion of the frame such as a frame fragment, to memory management unit 403 for storage and reorder.

Frame Fragmentation

Figure 6:
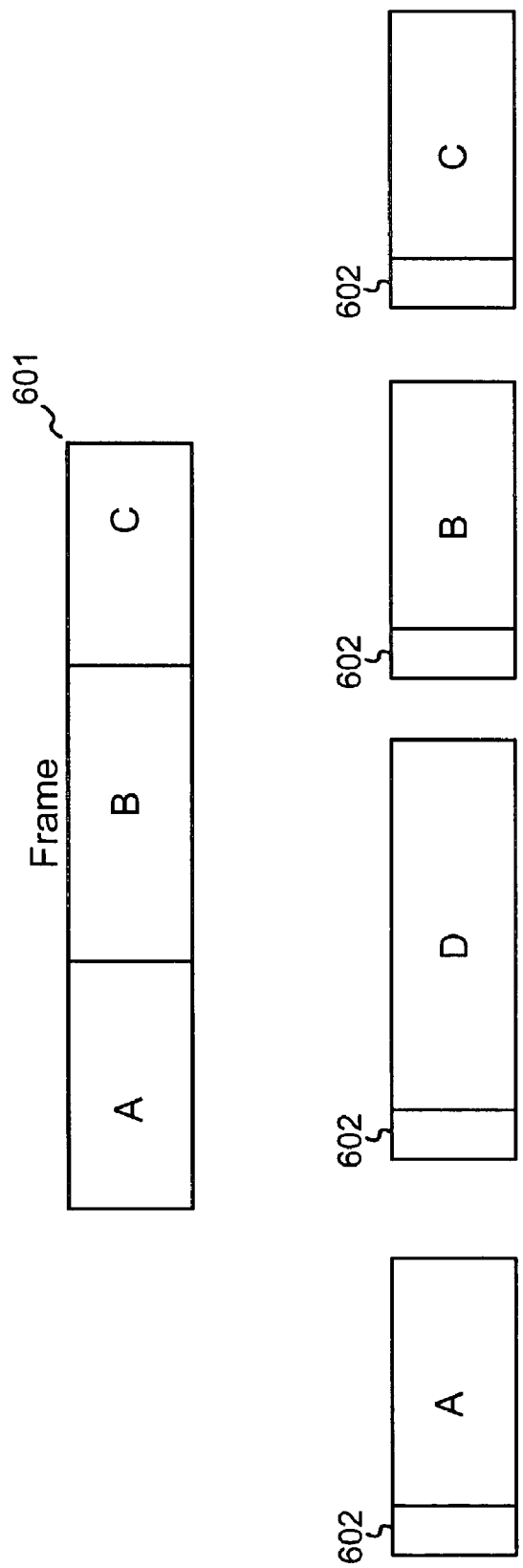
FIG. 6 is a diagram illustrating a frame fragment in additional detail.

As previously mentioned, parsers 501 may receive and process frames or frame fragments. FIG. 6 is a diagram illustrating a frame fragment in additional detail. Assume that original frame 601 is broken into three frame fragments, fragment A, B, and C, when it is transmitted by cable modem 302 to CMTS 303. In between frames A, B, and C, CMTS 303 may receive other frames or frame fragments, such as frame D, from other cable modems. Each of the frames or frame fragments A–D includes a header portion 602. Header portion 602 includes a number of pieces of information, including an identification of whether the frame is a complete frame or a frame fragment, and a service ID (SID). The SID is a device identification ID that is unique to each cable modem.

On-the-Fly Processing of Frames

Parsers 501 should process incoming frames and frame fragments as soon as possible. Consistent with an aspect of the invention, parsers 501 analyze frames as they are received, even when the frame is a frame fragment. The analysis performed by parsers 501 may relate to operations such as header consistency, CRC checks, and frame classification. In one implementation, to increase throughput, parsers 501 are implemented in hardware as application specific integrated circuits (ASICs).

When analyzing the frames as they are received, parsers 501 may generate a data structure, called a context, that defines the state of the analysis at any particular time. The context may, for example, include fields that define the state of fragment concatenation in memory 404 and fields that relate to the status of frame CRC checks. In the case of a frame fragment, for example, a parser 501 may perform as many functions as possible given that only a portion of the frame has been received. The parser may then write the context corresponding to the fragment to memory for later retrieval and forward the body of the fragment to memory management unit 403. The parser 501 may then process frames from other cable modems until a next portion of the frame fragment is retrieved. At this point, the parser 501 may retrieve the context from memory and then continue the analysis at the analysis state defined by the context. In this manner, parser 501 does not have to wait for a full frame to arrive before analyzing the frame.

Figure 7:
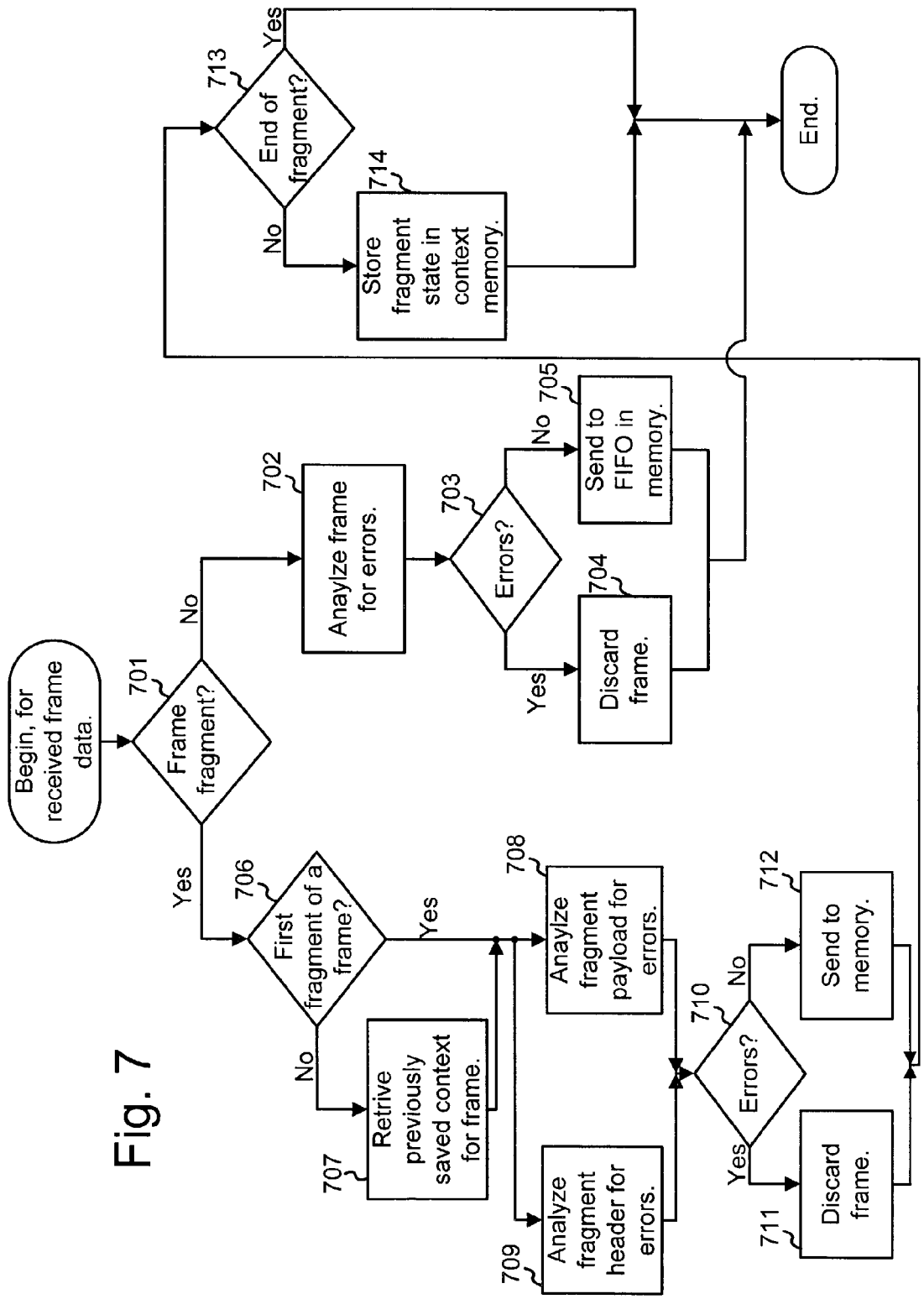
FIG. 7 is a flowchart illustrating processing of frames by parsers in a manner consistent with aspects of the invention.

FIG. 7 is a flowchart illustrating processing of frames by parsers 501 in a manner consistent with aspects of the invention.

To begin, for a frame received at one of parsers 501, the parser 501 looks at frame header 602 to determine whether the frame is a complete frame or a frame fragment (Act 701). If the frame is a complete frame, parser 501 analyzes the frame (Act 702). As previously mentioned, this analysis may include checking for header consistency, performing CRC checks, and other operations. In general, parser 501 determines if the frame is a good frame or if the frame was received with errors. If the frame contains errors, parser 501 may discard the frame (Acts 703 and 704). If the frame does not contain errors, parser 501 forwards the frame to memory management unit 403 for eventual storage in memory 404 (Acts 703 and 705).

Returning to Act 701, if the frame header indicates that the frame is a frame fragment, parser 501 determines if the fragment is the first fragment of a frame (Acts 701 and 706). Header 602 of the fragment stores information indicating whether a fragment is the first fragment of a frame. If the fragment is not the first fragment of the frame, parser 501 retrieves a previously stored context for the fragment (Act 707). The context for a fragment, as discussed in more detail below, contains state information that defines the processing state at which the processor "left off" processing with the previous fragment in the frame. Restoring the context allows the parser 501 to continue on-the-fly processing of the frame without having to wait for an entire fragment to arrive.

Parser 501 may then analyze the header and the payload of the frame fragment for errors (Acts 708 and 709). Acts 708 and 709 may be performed in parallel. If errors are found in either of Acts 708 or 709, the parser may discard the frame (Acts 710 and 711) Otherwise, parser 501 forwards the frame fragment to memory management unit 403 for eventual storage in memory 404 (Acts 710 and 712). Finally, if the fragment is the not the last fragment of the frame, parser 501 may update the context for the fragment (Acts 713 and 714). Header 602 contains information indicating whether a fragment is the final fragment of a frame.

Figure 8:
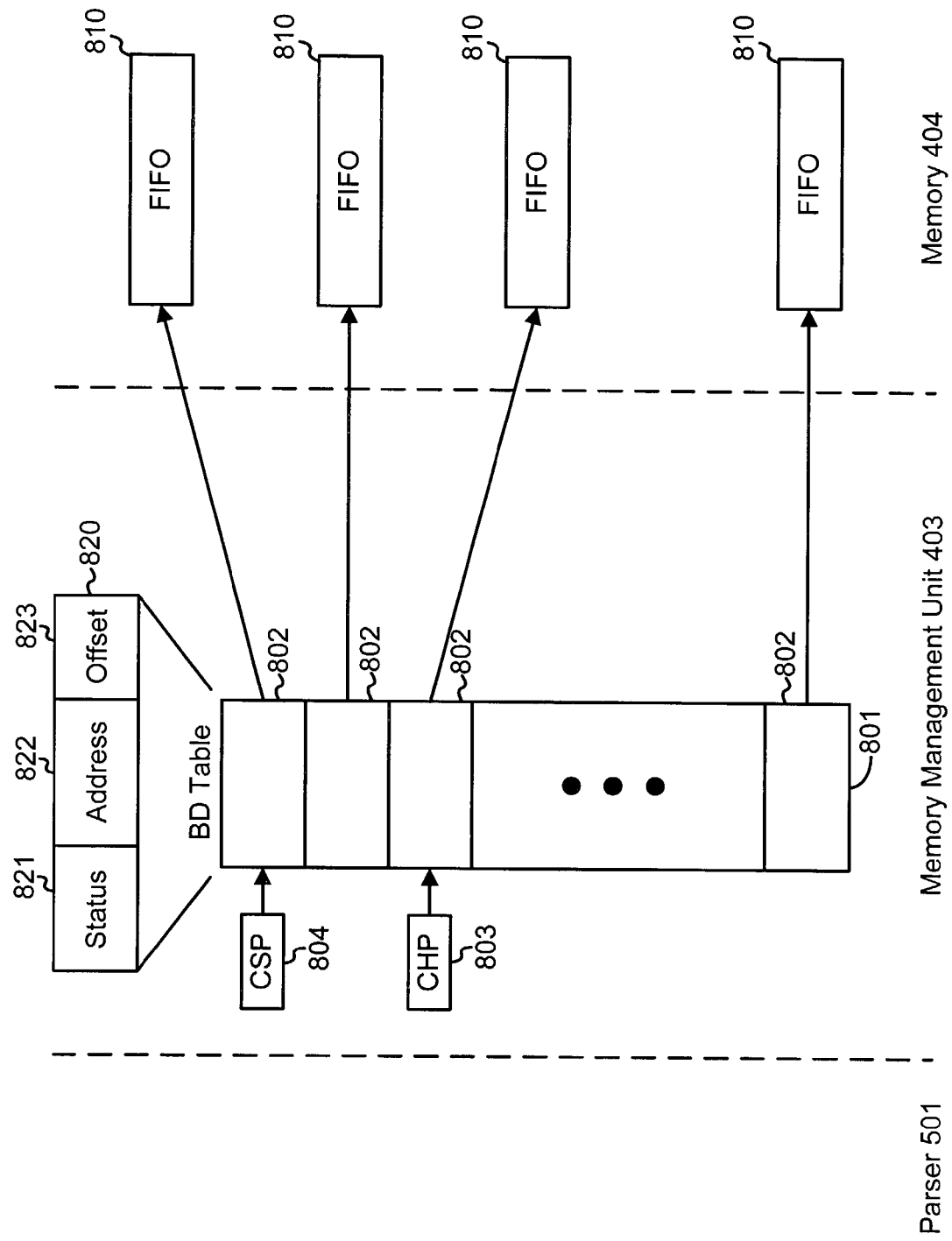
FIG. 8 is a diagram illustrating structures in the parser, memory management unit, and memory for handling incoming non-fragmented (i.e., complete) frames.

FIG. 8 is a diagram illustrating exemplary structures in parser 501, memory management unit 403, and memory 404 for handling incoming non-fragmented (i.e., complete) frames from parsers 501 of frame analyzer component 402. In general, memory management unit 403 manages the storage of incoming frames to memory 404. As shown, memory management unit 403 includes a buffer descriptor (BD) table 801, including a number of BD entries 802. BD entries 802 store references to first-in-first-out (FIFO) buffers 810 that store incoming frame data. BD table 801 is associated with a current hardware pointer (CHP) 803 and a current software pointer (CSP) 804. Through these two pointers, BD entries 802 are used as a circular list of entries, in which CHP 803 points to the head (front) of the list of entries and CSP 804 points to the tail of the list.

One of entries 802, labeled as entry 820, is shown in more detail in FIG. 8. Entry 820 may include three fields: a status field 821, an address field 822, and an offset field 823. Status field 821 stores the status of a frame in the process of being read into memory 404. Status field 821 may indicate, for example, whether the frame associated with the entry is completely stored in memory 404, is inactive, or is in the process of being stored in memory 404. Address field 822 may reference the head address of a first-in-first-out (FIFO) memory buffer 810 implemented in memory 404. Memory buffers 810 store the frames received from parsers 501. Offset field 823 may reference the total length of the FIFO buffer 810.

In general, in operation, an entry for an incoming frame is entered into table 801 at the entry 802 pointed to by CHP 803. As each entry is added, CHP 803 is incremented to point to the next entry in table 801. When CHP 803 reaches the last entry in table 801, it is incremented to point to the first entry in table 801, thus creating the circular list. CSP 804 references the frame that is currently being processed by software processing component 405. As software processing component 405 finishes processing a frame, it increments CSP 804 in table 801. In this manner, CSP 804 "follows" CHP 803. If CSP 804 reaches CHP 803 (i.e., it points to the same location in table 801), software processing component 405 waits until CHP 803 advances before processing the next frame. Similarly, if CHP 803 reaches CSP 804, table 801 is full.

Although only a single BD table 801 is shown in FIG. 8, in other implementations there may be multiple BD tables, such as a separate BD table for processing frames that contain user data ("data frames") and frames that contain management data. Further, cable modems 302 associated with a CMTS may be grouped into a number of different media access controller (MAC) domains. In this situation, a different BD table may be used for each MAC domain.

Figure 9:
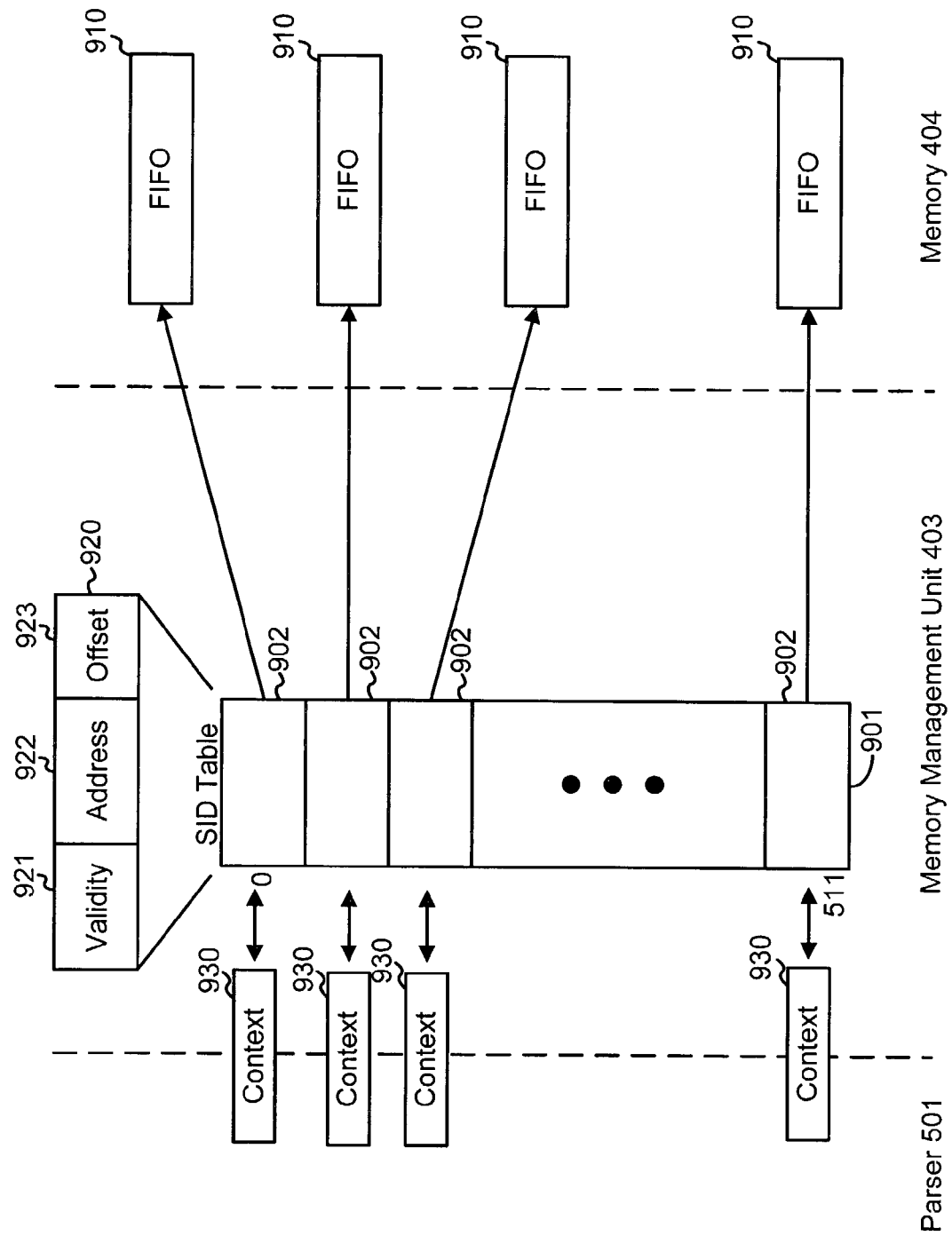
FIG. 9 is a diagram illustrating structures in the parser, memory management unit, and memory for handling incoming fragmented frames.

FIG. 9 is a diagram illustrating structures in parser 501, memory management unit 403, and memory 404 for handling incoming fragmented frames from parsers 501. As shown, memory management unit 403 includes a service ID (SID) table 901, including a number of SID entries 902. SID entries 902 are indexed based on the SID of corresponding cable modems 302. As previously mentioned, each cable modem 302 has a unique SID that it includes in headers 602 of all frame and frame fragment transmissions. If, for example, a CMTS 303 serves 32 cable modems per channel, then CMTS 303 may expect to see up to 32 different SIDs. Memory management unit 403 may map the space of possible SIDs to a single continuous range, such as, for example, zero to 31. The particular mapping to use may be determined by software processing component 405. By mapping the SID to a smaller address range, less internal memory may be needed. In this manner, based on the SID (or on the smaller mapped version of the SID) of any received frame fragment, memory management unit 403 may locate a predetermined entry 902 in SID table 901 that corresponds to the cable modem that transmitted the frame fragment.

In general, SID entries 902 store references to FIFO buffers 910 that store incoming frame data. One of entries 902, labeled as entry 920, is shown in more detail in FIG. 9. Entry 820 may include three fields: a validity field 921, an address field 922, and an offset field 923. Validity field 921, address field 922, and offset field 923 may be implemented in a manner similar to status field 821, address field 822, and offset field 823. In particular, validity field 921 stores the validity status of a frame fragment in the process of being read into memory 404. Validity field 921 may indicate, for example, whether the complete frame associated with entry 902 is stored in memory 404, whether the entry is inactive, or whether the entry is associated with fragments of the frame but not the whole frame. Address field 922 may reference the head address of the FIFO memory buffer 910. FIFO buffers 910 store the frame fragments received from parsers 501. As a new frame fragment is received from parser 501, it is added to previous frame fragments in buffer 910. Offset field 923 may reference the total length of the FIFO buffer 910.

Additionally, each entry 902 in SID table 901 is associated with a context buffer 930. The context buffer may be stored locally in a fast-access memory in parser 501. A copy of the context buffer may be additionally stored in memory management unit 403. As previously mentioned, parser 501 writes state information to the context buffers 930 that describe the status of the processing that has been performed on a frame fragment. More particularly, context buffers 930 may include fields that relate to the validity of the fragment, fields that define the state of the fragment concatenation in memory 404, and fields that relate to the status of CRC and other error checking procedures for the payload portion of the fragment. In one implementation, the same field in context buffers 930 may be used to store different values, depending on the current state of the parser process. For example, the same field in context buffers 930 may be used to store the HCS (header checksum) or the CRC depending on the current state of the parser process.

Figure 10:
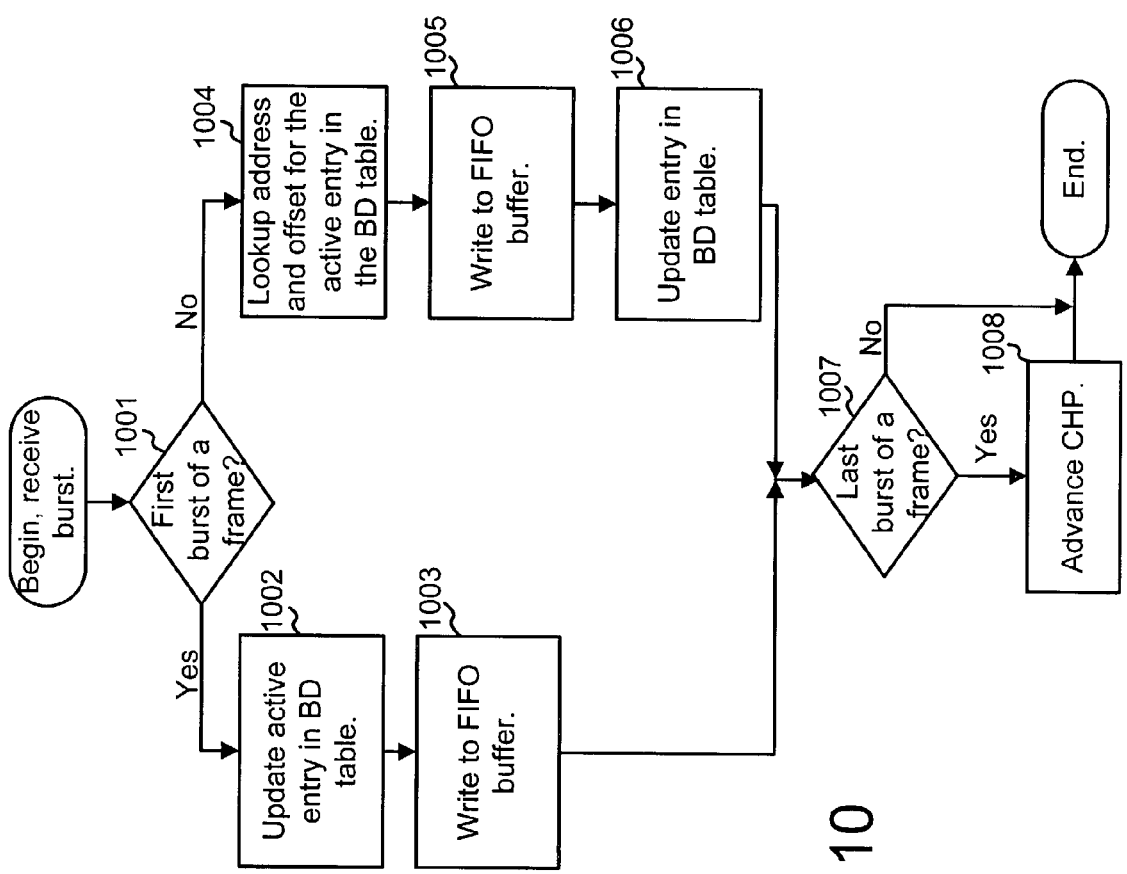
FIG. 10 is a flow chart illustrating operation of a memory management unit in processing non-fragmented frames received from parsers in the context of the memory structures shown in FIG. 8.

FIG. 10 is a flow chart illustrating operation of memory management unit 403 in processing non-fragmented frames received from parsers 501 in the context of the memory structures shown in FIG. 8. In one implementation, parsers 501 are connected to memory management unit 403 via a conventional PCI bus. When transmitting frames to memory management unit 403, parsers may break the frame into a number of pieces, referred to as "bursts," and transmit the frame to the memory management unit 403 as a series of PCI bursts.

When memory management unit 403 receives a PCI burst, it looks up the entry 802 pointed to by CHP 803 (FIG. 8). If the PCI burst is the first burst of a frame, memory management unit 403 may update status field 821 corresponding to the entry 802 pointed to by CHP 803, to reflect that the entry is active (Acts 1001 and 1002). Additionally, memory management unit 403 may update address field 822 and offset field 823 to point to the buffer 810 that is to be used to store this frame (Act 1002). The frame data may then be written to the pointed-to buffer 810 (Act 1003).

If the PCI burst is not the first burst in the frame, memory management unit 403 may read the address and the offset from the active entry 802 (i.e., the entry pointed to by CHP 803) (Acts 1001 and 1004). Based on the read address and offset, memory management unit 403 may then write the frame to buffer 810, (Act 1005), and update fields 821–823, as appropriate (Act 1006). Updating fields 821–823 may include modifying status field 821 to reflect that the written PCI burst was the last burst for the frame or modifying offset address 823 to reflect the new offset.

If the most recent PCI burst was the last PCI burst, the memory management unit 403 may increment the CHP (Acts 1007 and 1008).

Figure 11:
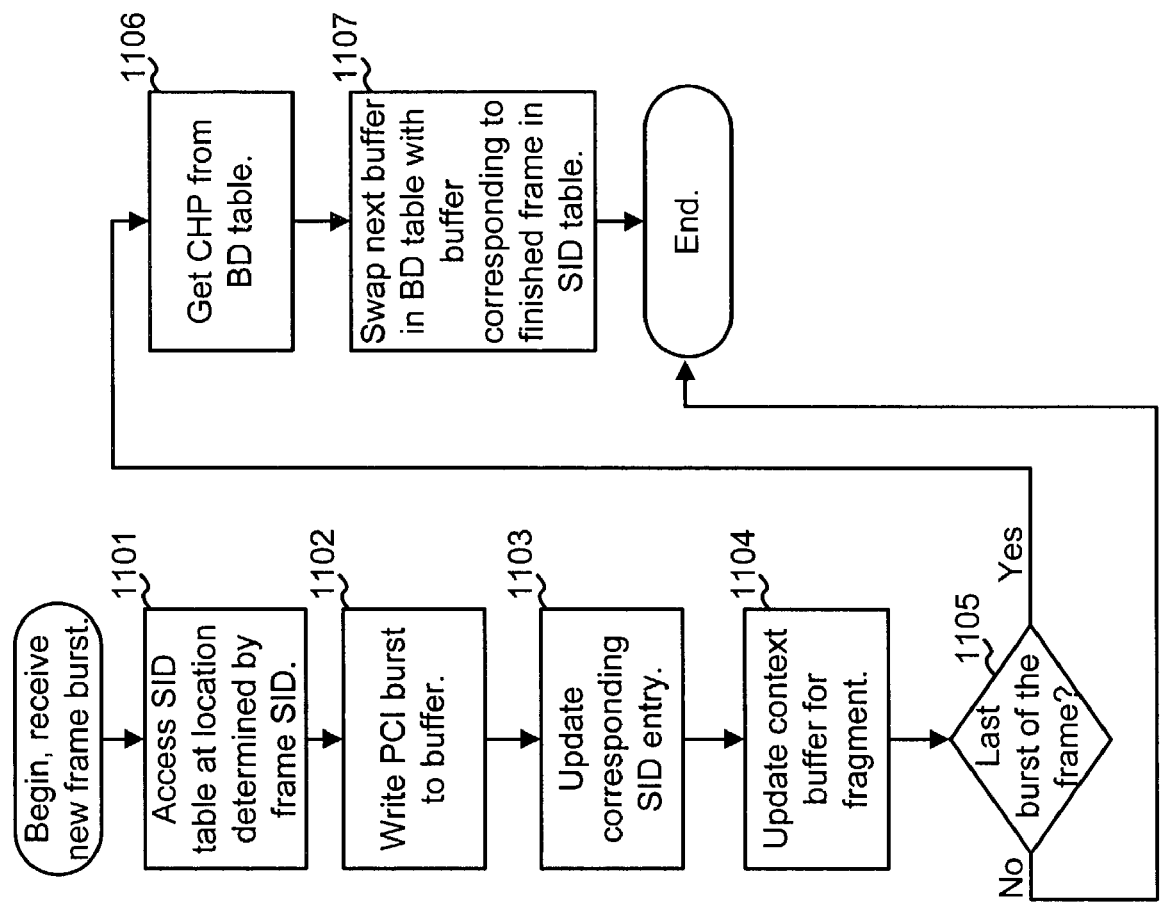
FIG. 11 is a flow chart illustrating operation of a memory management unit in processing fragmented frames received from parsers in the context of the memory structures shown in FIG. 9.

FIG. 11 is a flow chart illustrating operation of memory management unit 403 in processing fragmented frames received from parsers 501 in the context of the memory structures shown in FIG. 9. For fragmented frames, the frame is not guaranteed to be received by the parser 501 as one continuous stream of data, i.e., other frames and frame fragments can be received between frame fragments.

When memory management unit 403 receives a PCI burst of a frame fragment, it uses the SID, contained in the PCI burst, to index into SID table 901 (Act 1101). The indexed entry, entry 902, includes address field 923 that points to the appropriate FIFO buffer 910. The fragment PCI burst is then written into buffer 910, (Act 1102), and entry 902 is modified to update validity field 921 and offset field 923, as appropriate (Act 1103). Context buffer 930, which may also be associated with the frame's SID, may also be updated to reflect the completed processing state of the frame (Act 1104).

After the last burst of a frame is processed, memory management unit 403 may get the CHP value 803 associated with BD table 801 (see FIG. 8) (Acts 1105 and 1106). Memory management unit 403 then swaps buffer 910 with the buffer pointed-to by CHP 803 of BD table 801 (Act 1107). In one implementation, memory management unit may perform this buffer swap by exchanging entries in tables 801 and 901. This act effectively places the completed (non-fragmented) frame into the table for non-fragmented frames (table 801), and into the path of CSP 804, and thus software processing component 405.

CONCLUSION

As described above, on-the-fly frame processing and ordering are implemented in a cable communication system. A context memory is used to achieve on-the-fly processing of frame fragments. A circular table and a table address based on the cable modem that transmitted the frame are used to order and store received frames for further software processing.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

Moreover, while a series of acts has been presented with respect to FIGS. 7, 10, and 11, the order of the acts may be different in other implementations consistent with principles of the invention. Additionally, lines with arrows are used in the figures to generally illustrate the flow of data. In practice, embodiments consistent with the principles of the invention may send data on these lines in both directions.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for processing data items comprising:
   determining whether a received data item is a complete data item or a portion of a complete data item;
   accessing, when the received data item is determined to be a portion of the complete data item, state information relating to processing of the received data item, the state information being stored in a memory that is indexed based on source identification information that defines a sending device of the received data item, the source identification information including a service ID (SID) that uniquely defines a cable modem; and
   analyzing the received data item based on the state information to determine whether the data item contains errors.

2. The method of claim 1, wherein the data items are received based on a time division multiple access (TDMA) scheme.

3. The method of claim 1, further comprising:
   discarding data items that are determined to contain errors.

4. The method of claim 1, wherein each data item is a complete data frame or a frame fragment.

5. The method of claim 4, wherein the analysis includes at least one of checking for frame header consistency and performing cyclic redundancy checks.

6. The method of claim 1, further comprising:
   forwarding data items that are determined to not contain errors to a memory management unit configured to store data items in a memory.

7. The method of claim 6, wherein one of the data items is stored in a separate first-in-first-out (FIFO) buffer in the memory.

8. A system comprising:
   a digital signal processing component configured to receive analog data and convert the analog data to digital data items, at least one of the data items being output by the digital signal processing component as fragments of a complete data item;
   an analyzer component configured to receive the data items from the digital signal processing component and perform validation processing on the data items as the data items are received from the digital signal processing component, the analyzer component, when processing those of the data items that are received as fragments, retrieving previously stored information that describes a state of the analyzer component when the analyzer component finished processing a previous fragment of the data item and resuming processing of the data item at the described state;
   a memory management unit coupled to the analyzer component and configured to receive the data items and the fragments from the analyzer component and to store the data items in buffers, the memory management unit further including
     a first table in which references to non-fragmented data items are stored, and
     a second table in which references to the fragments are stored as entries that are indexed based on sources of the fragments.

9. The system of claim 8, wherein, when all of the fragments corresponding to a data item are entered in the second table at a particular table entry, the memory management unit transfers contents of the particular table entry to an entry in the first table.

10. The system of claim 8, wherein the memory management unit further includes:
    a first pointer that points to an entry in the first table that corresponds to a location at which new data items are stored; and
    a second pointer that points to an entry in the first table that corresponds to a location from which the data items are removed from the first table.

11. The system of claim 8, wherein the data items are data frames.

12. The system of claim 8, wherein the validation processing includes at least one of checking for frame header consistency and performing cyclic redundancy checks.

13. The system of claim 8, wherein the digital signal processing component receives the analog data over cable television lines.

14. A method for processing data items received over a communication line, the method comprising:
    storing a received one of the data items in a memory buffer;
    determining if the received one of the data items is a complete data frame or a fragment of a data frame;
    updating an entry in a first table to reference the memory buffer when the data item is a complete data frame;
    updating an entry in a second table to reference the memory buffer when the data item is a fragment of the data frame; and
    transferring, when a last fragment of the data frame has been stored in the memory buffer, the entry in the second table to the first table.

15. The method of claim 14, wherein the communication line is a cable television line.

16. The method of claim 14, wherein the memory buffer is a first-in-first-out (FIFO) memory buffer.

17. The method of claim 14, further comprising:
    determining if the received one of the data items is the complete data frame or the fragment of a data frame based on information in a header of the received one of the data items.

18. The method of claim 14, wherein updating the entry in the second table is based on a transmission source of the data item.

19. The method of claim 14, wherein the entry updated in the first table is an entry pointed to by a first pointer.

20. The method of claim 19, wherein the first pointer is incremented after the entry in the first table is updated.

21. The method of claim 19, further comprising:
reading data items in the memory buffer based on a position of a second pointer associated with the first table.

22. A memory management device comprising:
a first table configured to store a plurality of entries that reference first buffers in a memory, the entries in the first table corresponding to complete data frames stored in the first buffers; and
a second table configured to store a plurality of entries that reference second buffers in the memory, the entries in the second table corresponding to fragments of data frames stored in the second buffers, the second table entries being addressable based on a transmitting source of the fragments of the data frames.

23. The device of claim 22, further comprising:
a first pointer referencing one of the plurality of entries in the first table at which received data items are to be added to the first table; and
a second pointer referencing one of the plurality of entries in the first table at which received data items are to be removed from the first table.

24. The device of claim 23, wherein, when a plurality of data frame fragments that together form a complete data frame have been written to one of the second buffers, the corresponding entry in the second table is transferred to the entry in the first table referenced by the first pointer.

25. The device of claim 23, wherein the first pointer is incremented after one of the plurality of entries in the first table is updated.

26. The device of claim 23, wherein the first and second buffers are first-in-first-out (FIFO) buffers.

\* \* \* \* \*